United States Patent [19]
Ruggeberg et al.

[11] Patent Number: 4,965,105
[45] Date of Patent: Oct. 23, 1990

[54] INSULATION SLEEVE FOR GALVANIC PRIMARY CELLS

[75] Inventors: Klaus Ruggeberg, Ellwangen; Horst-Udo Jose, Fichtenau-Unterdeufstetten, Fed. Rep. of Germany

[73] Assignee: Varta Batterie Aktiengesellschaft, Hanover, Fed. Rep. of Germany

[21] Appl. No.: 271,020

[22] Filed: Nov. 14, 1988

[30] Foreign Application Priority Data

Dec. 11, 1987 [DE] Fed. Rep. of Germany ....... 3742027

[51] Int. Cl.$^5$ ............................................. H01M 2/02
[52] U.S. Cl. .................................. 428/34.2; 138/150; 138/154; 428/124; 429/164
[58] Field of Search ....................... 156/192, 195, 227; 428/34.2, 124; 138/129, 150, 154; 429/164

[56] References Cited

U.S. PATENT DOCUMENTS

| | | | |
|---|---|---|---|
| 3,014,501 | 12/1961 | Jacobi ................................... | 138/124 |
| 3,312,250 | 4/1967 | Sirignano et al. .................... | 138/129 |
| 3,616,819 | 11/1971 | Dunlap, Jr. et al. ................. | 156/194 |
| 3,695,971 | 10/1972 | Corning, Jr. ......................... | 156/195 |
| 3,716,435 | 2/1973 | Jensen et al. ........................ | 156/195 |
| 4,645,553 | 2/1987 | Languillat ........................... | 156/195 |

*Primary Examiner*—James Seidleck
*Attorney, Agent, or Firm*—Weiser & Stapler

[57] ABSTRACT

An insulation sleeve for the can-shaped soluble anode of a round galvanic primary cell, which immobilizes emerging electrolyte and shields retained moisture from the exterior, and which electrically insulates the electrode conductor, includes a helically wound paper web having a plastic lining on one side and a lengthwise paper edge which is endlessly folded over, and which is wound onto a winding spindle so that the folded-over edge helically overlaps the opposite edge of the paper web to allow the superimposed plastic layers to be welded to one another in the overlapping zone. By successively winding a conventional paper strip with the plastic-lined paper web, an even stronger sleeve tube is obtained, which can then be cut into individual sleeves.

26 Claims, 1 Drawing Sheet

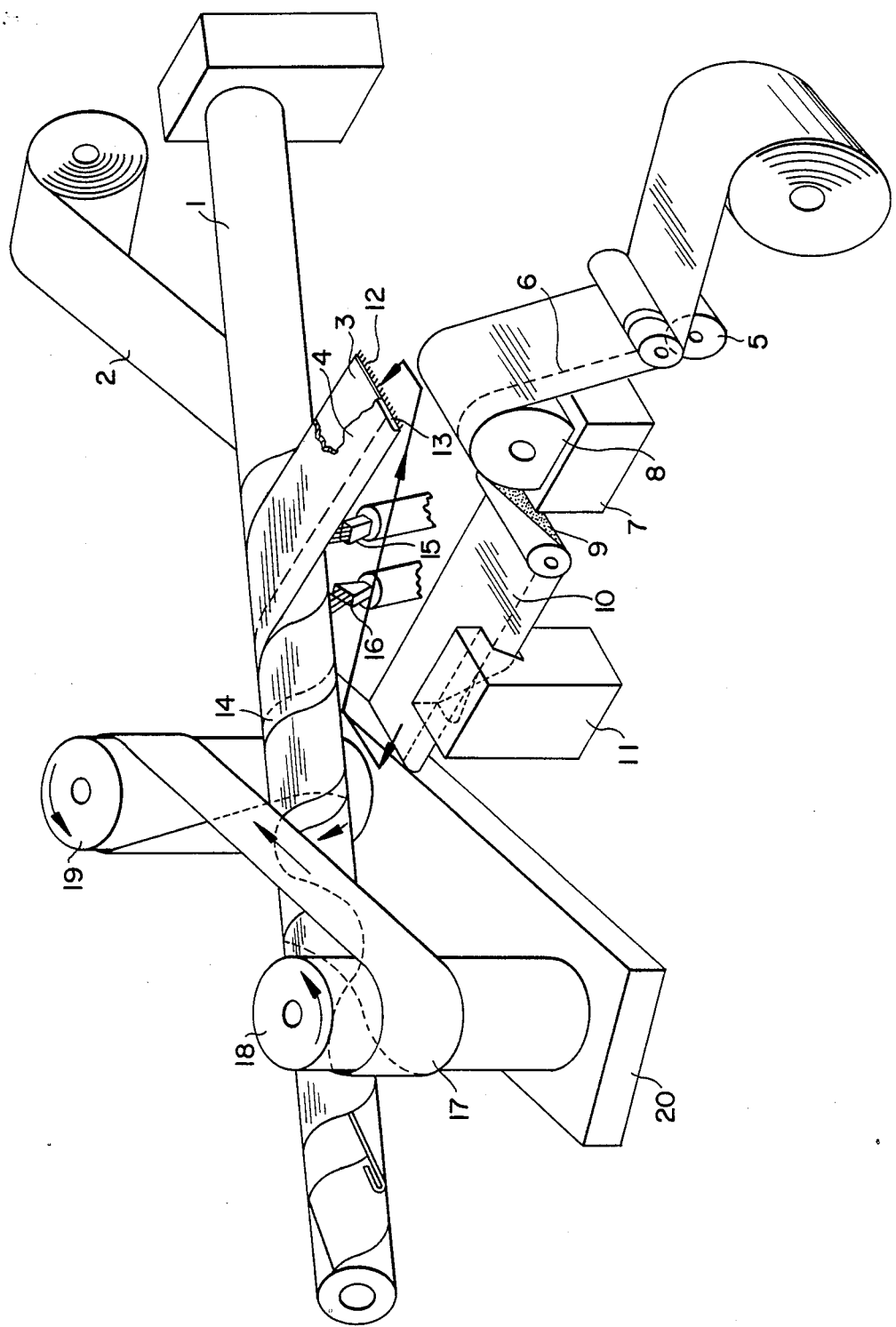

INSULATION SLEEVE FOR GALVANIC PRIMARY CELLS

BACKGROUND OF THE INVENTION

The present invention generally pertains to an insulation sleeve for a galvanic primary element in the form of a round cell, and which is generally comprised of a coiled paper strip lined on one side with plastic, in addition to a process for producing it.

Primary cells are conventionally provided with an outer, sheet-metal casing which in addition to a protective function, also serves certain decorative purposes and provides required labelling for information such as battery type, voltage, manufacturer, etc. This metal casing must not have any electrical contact with other metallic parts of the cell which are in contact with the electrochemically active electrode substances, or which form a terminal of the primary cell. For this purpose, an insulation layer in the form of a cylindrical cardboard casing has long been used (e.g., in zinc-carbon primary cells) to protect the can-shaped negative soluble electrode from contact with the sheetmetal casing. To prevent leakage of the cell's electrolyte, the edges of the sheet-metal casing are sealed to a cover or base disk, generally by means of an asphalt compound or plastic.

However, such arrangements tend to exhibit certain disadvantages, resulting both from their production costs and their thickness. This latter disadvantage is particularly acute since the outer diameter of the primary cell is predefined, leaving less room for the active material. A further disadvantage of absorbent insulation materials such as cardboard or paper is that such materials are particularly capable of absorbing emerging electrolyte fluid, even directly from pores in the wall of a zinc can that has severely corroded.

A relatively expensive substitute for such cardboard casings is described in US-PS No. 2,802,042, which describes a three-layer plastic sleeve that is additionally laminated with Kraft paper or impregnated paper on both sides. Edges of this plastic sleeve which project above the electrode can are then folded together with the outer metal casing and with a base or cover plate. It has also been attempted to improve the shelf life and leak-proofing of round cells with insulated zinc anodes by shrinking a plastic tube (sleeve) onto the zinc can, and by providing ends of the can with insulation disks or rings.

In the interests of cost and efficiency, such cardboard and paper sleeves have been produced in a variety of different ways by coiling them, using helical winding machines, from endless webs of fabrics, cellulose derivatives and the like, which are then adhesively bonded to one another. An example of such processes may be had with reference to DE-PS No. 25 49 515. Processes for the production of such sleeves are also known from the packaging industry, where helical-winding and sleeve-sealing technology is widely applied.

DE-OS No. 1,956,779 describes an electrode sleeve for a round galvanic primary cell which is produced complete with a surrounding protective covering. This is accomplished by helically rolling a zinc strip onto a winding spindle (or mandrel), and then winding a double web of paper around the rolled zinc strip while simultaneously adhesively bonding the wound layers to one another.

However, experience has shown that even those helically wound insulation sleeves which have been manufactured according to the current state of the art are not capable of sufficiently retaining or immobilizing electrolyte which emerges from the soluble anode of the cell since they do not develop an insulation layer which is completely sealed. It has been found that even extensive adhesively bonded areas within a winding can neither prevent electrolyte from arriving, through leakage paths, at the outer sheet-metal casing of the cell, nor prevent corrosion currents from accelerating losses in capacity.

SUMMARY OF THE INVENTION

It is therefore the primary object of the present invention to provide an insulation sleeve for enclosing the soluble electrode of a round galvanic primary cell which can be produced by simple winding techniques and processes.

It is also an object of the present invention to provide an improved insulation sleeve for enclosing the soluble electrode of a round galvanic primary cell which, in addition to reliable electrical insulation, is capable of developing a substantially complete electrolyte seal.

These and other objects are achieved in accordance with the present invention by providing an insulation sleeve for a round galvanic primary cell which takes the form of a coiled paper strip which is lined on one side with plastic, and which is developed by coiling a paper web having a plastic coating on its upper side, and a lengthwise edge which is (endlessly) folded over in a general downward direction toward the underside, such that the folded edge overlaps the opposite edge of the web, and by then joining the coiled paper web in this overlapping zone by means of the adjoining plastic coatings.

For further detail regarding this insulation sleeve and its method of manufacture, reference is made to the detailed description which is provided below, in conjunction with an accompanying schematic perspective view of an apparatus for producing a two-layer sleeve winding in accordance with the present invention.

DETAILED DESCRIPTION OF THE PREFERRED EMBODIMENT

A welded joint between the turns of a wound paper strip which bears a plastic coating on only one side requires mutual plastic contact, but with only one layer of paper. According to the present invention, this is achieved by providing the paper web with a narrow lengthwise strip on its edge which is folded down (endlessly) until it comes into contact with the underside of the paper web (with its plastic lining facing outward) before the paper web is rolled onto a winding spindle. By selecting the proper winding angle and helical pitch, it becomes possible to roll the paper web, with its folded edge, onto the winding spindle such that the folded-over lengthwise edge precisely and continuously overlaps the opposite edge of the paper web. The result is a sleeve tube with a helical overlap zone in which two plastic linings are in direct contact with one another, so that they can be joined in a welded seam.

In a preferred embodiment of the present invention, as illustrated in the accompanying FIGURE, the plastic-welded insulation sleeve serves as the outer sleeve of a two-layer or multiple-layer coil, the inner layer(s) of which are comprised of conventional paper strips. The resulting sleeve possesses enhanced strength and absorption.

To this end, paper webs 2, 3 are wound onto a winding spindle 1, in succession, with the first paper web 2 being wound obliquely from below, and the second paper web 3 being wound obliquely from above. The first paper web 2, which is formed as a conventional endless strip, and the second paper web 3, which is also formed as an endless strip but with a plastic lining 4 on its upper side, are successively conveyed at an oblique angle toward and onto a stationary winding spindle 1 (mandrel) using techniques (feed rollers) which are in themselves known.

The plastic layer on the paper web 3 can be any of a variety of sealable materials. Useful in this regard are polyolefins (PE, PP), ethylene copolymers, ionomers, ethylene-vinyl acetate copolymers (EVA) and polyvinyl-chloride (PVC), among others. Paper webs lined with these plastics are commercially available.

In accordance with the present invention, and prior to winding, the paper web 3 is subjected to a pretreatment which is schematically illustrated in the foreground of the illustrative FIGURE. This pretreatment begins with the development of a fold line 6 in the moving paper web, close to and parallel to its left edge, by a scoring device 5. This prepares the paper web for, and facilitates subsequent endless folding of a narrow lengthwise paper edge 10. However, prior to this folding procedure, the underside 9 of the paper web 3 is coated with adhesive from a glue pot (container 7) using an appropriate application roller 8.

The paper web 3, with its applied adhesive, then passes through an apparatus 11 which contains one or more fingers for folding the lengthwise edge 10 over the remainder of the paper web. After passing from the apparatus 11, the folded lengthwise edge 10 is positioned on the underside of the paper web, with the adhesive coating on the folded edge facing the adhesive coating on the remainder of the paper web, and with the plastic lining of the paper web facing upwardly. As a result, there is present on the underside of the paper web, next to a relatively wide adhesive layer zone 12, a narrow edge zone 13 with a plastic surface. This provides a basis for the winding process which then follows, to weld the paper web 3 along a helical overlap zone 14 which is oriented at a suitable helical pitch such that the folded-over edge 10 of the paper web 3 lies precisely and continuously over the unaltered edge on the opposite side of the paper web. The two plastic layers are thus placed in direct contact with one another. At the same time, the second paper web 3 (with its adhesive underside) is helically wound onto the first paper web 2.

It is also possible to wind the paper webs onto the mandrel in transverse fashion, so that the folded edge runs parallel to the axis of the finished sleeve. However, helical or spiral winding is generally preferred.

Following the winding procedure, the plastic linings are welded in the overlapping zone 14 which is developed using a pair of hot-air nozzles 15, 16 which are located in the immediate vicinity of the position where the paper web 3 enters the winding spindle 1. One of the nozzles 15 is directed toward the folded-over lengthwise edge 10 of the paper web 3, while the other nozzle 16 is directed toward the opposite edge. To be noted is that direct welding on the winding spindle 1 using other techniques, such as ultrasonic welding or adhesive bonding, is also possible.

Once the helically wound strips 2, 3 have been welded and adhesively bonded, they are consolidated and compressed into a sleeve tube under the pressure of a circumferential winding belt 17. The winding belt 17 is an endless leather or fabric belt which is driven by opposing rollers 18, 19 mounted on a support 20 which can be shifted obliquely to the winding spindle 1 to match the winding pitch. In any event, the desired amount of advance is imparted to the resulting sleeve tube because of the oblique positioning and motion of the winding belt 17. At the end of the winding spindle (although not shown in the FIGURE), the manufactured sleeve slides over a cutting mandrel that is mounted in the winding spindle and which rotates at the same circumferential (helical) rotation speed as the sleeve tube. The cutting mandrel separates the sleeve tube into short sleeves by means of roller knives, which are otherwise known (for example, from DE-OS No. 1,956,779).

The finished insulation sleeves are clamped or crimped in the positive and negative ends of the round cell, following its assembly, and therefore represent a separate sealing element against both leaking electrolyte and desiccation, which leads to improved shelf life for the primary cell.

The sleeve of the present invention therefore offers the advantage of continuous production at low cost with the use of only one plastic-coated paper layer, while assuring an effective seal resulting from the welded (sealed) paper-lined plastic sheath which is produced. This operates to immobilize any electrolyte emerging from the soluble anode, and to shield the moist outer paper layer. Such paper webs therefore make maximum use of their electrolyte absorption capacity and electrical insulation ability.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. An insulation sleeve for a round galvanic primary cell comprising a coiled paper strip with an absorbent underside forming an inner tubular surface of the coiled strip for absorbing electrolyte and a plastic coated upper side forming an outer tubular surface of the coiled strip for sealing in the electrolyte and for shielding the absorbing layer, said strip having a first lengthwise edge folded over toward the underside such that the folded over edge overlaps and is adhesively joined to a second, unaltered lengthwise edge of the coiled strip.

2. The insulation sleeve of claim 1 wherein only one lengthwise edge of the coiled strip is folded over toward the underside.

3. The insulation sleeve of claim 1 wherein the folded over edge of the coiled strip overlaps and is adhesively joined to the unaltered edge by means of fused plastic coatings.

4. The insulation sleeve of claim 1 wherein the folded over edge of the coiled strip overlaps a portion of the plastic coated upper side forming the outer tubular surface of the coiled strip.

5. The insulation sleeve of claim 1 wherein the folded over edge has a fold line.

6. The insulation sleeve of claim 1 further comprising a second paper strip which is electrolyte absorbent and which is positioned under and adhesively bonded to the absorbent underside of the coiled paper strip.

7. The insulation sleeve of claim 1 wherein the insulation sleeve is sealed at ends of the sleeve.

8. The insulation sleeve of claim 1 wherein the paper strip is helically coiled.

9. The insulation sleeve of claim 1 wherein the first lengthwise edge is continuously folded over toward the underside.

10. The insulation sleeve of claim 1 wherein the plastic coating on the folded over edge is located on a side of the paper strip which contacts the upper side forming the outer tubular surface of the coiled strip.

11. The insulation sleeve of claim 1 wherein the folded over edge covers the second unaltered edge.

12. An insulation sleeve for a round galvanic primary cell comprising a coiled paper strip with an absorbent underside forming an inner tubular surface of the coiled strip for absorbing electrolyte and a plastic coated upper side forming an outer tubular surface of the coiled strip for sealing the electrolyte and for shielding the absorbing layer, said strip having a first lengthwise edge folded over toward the underside such that the folded over edge overlaps and contacts a portion of the plastic coated upper side forming the outer tubular surface of the coiled strip, and such that said folded over edge covers and is adhesively joined to a second unaltered lengthwise edge of the coiled strip by means of fused plastic coatings.

13. A round galvanic primary cell which comprises an insulation sleeve formed as a coiled trip with an absorbent underside forming an inner tubular surface of the coiled strip for absorbing electrolyte and a plastic coated upper side forming an outer tubular surface of the coiled strip for sealing in the electrolyte and for shielding the absorbent layer, said strip having a first lengthwise edge folded over toward the underside such that the folded over edge overlaps and is adhesively joined to a second unaltered edge of the coiled strip.

14. The galvanic cell of claim 13 wherein only one lengthwise edge of the coiled strip is folded over toward the underside.

15. The galvanic cell of claim 13 wherein the folded over edge of the coiled strip overlaps and is adhesively joined to the unaltered edge of the coiled strip by means of fused plastic coatings.

16. The galvanic cell of claim 13 wherein the folded over edge of the coiled strip overlaps a portion of the plastic coated upper side forming the outer tubular surface of the coiled strip.

17. The galvanic cell of claim 13 wherein the folded over edge has a fold line.

18. The galvanic cell of claim 13 further comprising a second paper strip which is electrolyte absorbent and which is positioned under the adhesively bonded to the absorbent underside of the coiled paper strip.

19. The galvanic cell of claim 13 wherein the paper strip is helically coiled.

20. The galvanic cell of claim 13 wherein the lengthwise edge is continuously folded over toward the underside.

21. The galvanic cell of claim 13 wherein the plastic coating on the folded over edge is located on a side of the paper strip which contacts the plastic coated upper side forming the outer tubular surface of the coiled strip.

22. The galvanic cell of claim 13 wherein the folded over edge covers the second unaltered edge.

23. The galvanic cell of claim 13 wherein the insulation sleeve encloses an electrode of the round galvanic primary cell.

24. The galvanic cell of claim 13 wherein the absorbent underside of the insulation sleeve is adjacent to the enclosed electrode of the galvanic cell.

25. The galvanic cell of claim 13 wherein the insulation sleeve is sealed at ends of the sleeve.

26. A round galvanic primary cell which comprises an insulation sleeve formed as a coiled paper strip with an absorbent underside forming an inner tubular surface of the coiled strip for absorbing electrolyte and a plastic coated upper side forming an outer tubular surface of the coiled strip for sealing the electrolyte and for shielding the absorbing layer, said strip having a first lengthwise edge folded over toward the underside such that the folded over edge overlaps and contacts a portion of the plastic coated upper side forming the outer tubular surface of the coiled strip, and such that said folded over edge covers and is adhesively joined to a second unaltered lengthwise edge of the coiled strip by means of fused plastic coatings.

* * * * *